(12) United States Patent
Celant et al.

(10) Patent No.: US 11,931,941 B2
(45) Date of Patent: Mar. 19, 2024

(54) PROCESS FOR MANUFACTURING AN ELASTOMER TIMEPIECE COMPONENT

(71) Applicant: ROLEX SA, Geneva (CH)

(72) Inventors: Benjamin Celant, Cornier (FR);
Laurent Mincone, Jonzier-Epagny (FR)

(73) Assignee: ROLEX SA, Geneva (CH)

( * ) Notice: Subject to any disclaimer, the term of this patent is extended or adjusted under 35 U.S.C. 154(b) by 678 days.

(21) Appl. No.: 16/013,075

(22) Filed: Jun. 20, 2018

(65) Prior Publication Data

US 2018/0370106 A1    Dec. 27, 2018

(30) Foreign Application Priority Data

Jun. 22, 2017   (CH) .................................. 00816/17
Jun. 22, 2017   (EP) .................................. 17177404

(51) Int. Cl.
*B29C 45/73* (2006.01)
*A44C 5/00* (2006.01)
(Continued)

(52) U.S. Cl.
CPC ............ *B29C 45/73* (2013.01); *A44C 5/0053* (2013.01); *A44C 27/001* (2013.01); *B29C 35/0288* (2013.01); *B29C 45/14* (2013.01); *B29C 45/14311* (2013.01); *B29C 45/14778* (2013.01); *B29C 45/78* (2013.01); *B32B 15/06* (2013.01); *G04B 37/22* (2013.01);
(Continued)

(58) Field of Classification Search
None
See application file for complete search history.

(56) References Cited

U.S. PATENT DOCUMENTS 4,818,829 A * 4/1989 Nopper .................. B29C 43/18
                                                    200/5 A
5,135,694 A * 8/1992 Akahane ........... B29C 45/14065
                                                    264/138
(Continued)

FOREIGN PATENT DOCUMENTS

FR    2500370 A1 *  8/1982    ............. B29C 33/04
JP    2-310019 A    12/1990
JP    6-253910 A     9/1994

OTHER PUBLICATIONS

English translation of FR 2500370A1 (Year: 1982).*
(Continued)

*Primary Examiner* — Jacob T Minskey
*Assistant Examiner* — Adrien J Bernard
(74) *Attorney, Agent, or Firm* — WHDA, LLP (57) ABSTRACT

A process for manufacturing a timepiece component having a first step (E1) consisting in arranging a metal insert in an injection mold, one surface of said metal insert being at least partially coated with a primer, a second step (E2) of injecting an elastomer material into the injection mold in order to overmold the elastomer material over the metal insert, a third step (E3) of vulcanizing the elastomer material, wherein the temperature of the injection mold is variable, and a step (E31) of increasing the temperature of the injection mold between a first temperature at a first instant during the injection second step (E2), and a second temperature higher than the first temperature at a second instant, during the vulcanization third step (E3).

17 Claims, 5 Drawing Sheets

(51) Int. Cl.
*A44C 27/00* (2006.01)
*B29C 35/02* (2006.01)
*B29C 45/14* (2006.01)
*B29C 45/78* (2006.01)
*B32B 15/06* (2006.01)
*G04B 37/22* (2006.01)
*B29K 21/00* (2006.01)
*B29K 105/24* (2006.01)
*B29K 705/00* (2006.01)
*B29K 705/14* (2006.01)
*B29L 31/00* (2006.01)

(52) U.S. Cl.
CPC .............. *B29C 2945/76622* (2013.01); *B29K 2021/00* (2013.01); *B29K 2021/003* (2013.01); *B29K 2021/006* (2013.01); *B29K 2105/24* (2013.01); *B29K 2705/00* (2013.01); *B29K 2705/14* (2013.01); *B29L 2031/739* (2013.01); *B32B 2307/51* (2013.01)

(56) References Cited

U.S. PATENT DOCUMENTS

| | | | | |
|---|---|---|---|---|
| 5,213,739 | A | * | 5/1993 | Dickerson ......... B29C 45/14311 |
| | | | | 156/245 |
| 2004/0145082 | A1 | * | 7/2004 | Miller ................... B29C 45/44 |
| | | | | 264/318 |
| 2009/0200706 | A1 | * | 8/2009 | Bessac ................. B29C 31/041 |
| | | | | 425/144 |

OTHER PUBLICATIONS

European Search Report and Written Opinion dated Nov. 28, 2017 issued in counterpart application No. EP17177404; w/ English machine translation (21 pages).

* cited by examiner

FIG. 5 ns. EP 17177404.5 filed Jun. 22, 2017 and Swiss Patent application No. CH 00816/17 filed Jun. 22, 2017, each of which is hereby incorporated herein by reference in its entirety.

INTRODUCTION

The present invention relates to a process for manufacturing an elastomer timepiece component, particularly a wrist strap, comprising a metal insert. It also relates to a timepiece component as is, and also to a wristwatch as is comprising such a timepiece component.

PRIOR ART

Many wrist straps used for horological applications are formed of a metal insert covered with an elastomer material, in order to combine the complementary advantages of both materials, and in particular to obtain a flexible and comfortable wrist strap offering sufficiently firm support around the wrist of a user.

A conventional process for manufacturing such a wrist strap consists in depositing a metal insert, surface-coated with a primer forming a tie layer, within an injection mold in which the elastomer material is injected or compressed, so as to adopt its final shape predefined by the mold, after its vulcanization, while adhering perfectly to the entire surface of the metal insert by means of the primer. The elastomer material is thus overmolded over the metal insert.

There is a current trend toward developing timepiece components formed by this combination between a metal element and an elastomer material.

Thus, the general objective of the invention is to improve the conventional manufacturing process described above in order to give it a wide use, suitable for new horological applications, for example for timepiece components of diversified shapes and/or having novel mechanical properties, and in a manner compatible with use of materials chosen from an enlarged list.

BRIEF DESCRIPTION OF THE INVENTION

For this purpose, the invention is based on a process for manufacturing a timepiece component comprising:
- a first step consisting in arranging a metal insert in an injection mold, one surface of said metal insert being at least partially coated with a primer,
- a second step of injecting an elastomer material into the injection mold in order to overmold the elastomer material over the metal insert,
- a third step of "vulcanizing" the elastomer material, wherein the temperature of the injection mold is variable, the process comprising a step of increasing the temperature of the injection mold between a first temperature at a first instant during the injection second step, and a second temperature higher than the first temperature at a second instant, during the vulcanization third step.

The invention also relates to a timepiece component comprising a metal core covered with an elastomer material, wherein the metal core comprises a surface area to volume ratio of greater than or equal to 1 mm$^{-1}$, or greater than or equal to 10 mm$^{-1}$, or greater than or equal to 20 mm$^{-1}$, and/or wherein the metal core comprises a thin zone of less than or equal to 5 mm, or less than or equal to 2 mm, or less than or equal to 0.5 mm.

This timepiece component advantageously comprises an adhesion layer between the elastomer material and the metal core ensuring the adhesion of the elastomer material around the metal core. This adhesion layer advantageously extends over the entire contact area between the elastomer material and the metal core, ensuring their adhesion over their entire area of overlap.

The invention is precisely defined by the claims.

BRIEF DESCRIPTION OF THE FIGURES

These subjects, features and advantages of the invention will be disclosed in detail in the following description of a particular embodiment given nonlimitingly in connection with the appended figures among which.

The conventional process for manufacturing a wrist strap, which will be improved and which could be applied to any timepiece component, more specifically comprises a first step E1 consisting in arranging a metal insert in a preheated injection mold, the surface of the insert being covered with a primer. It then comprises an injection second step E2 consisting of the injection of the elastomer material, then a third step, referred to as third step E3 of vulcanizing the elastomer material, consisting of heating the elastomer material at a temperature that enables the formation of chemical bonds that will ensure the shape retention of the part. Finally, in a fourth step E4, the mold is opened and the finished component is removed from the mold and cooled.

Figure 1:
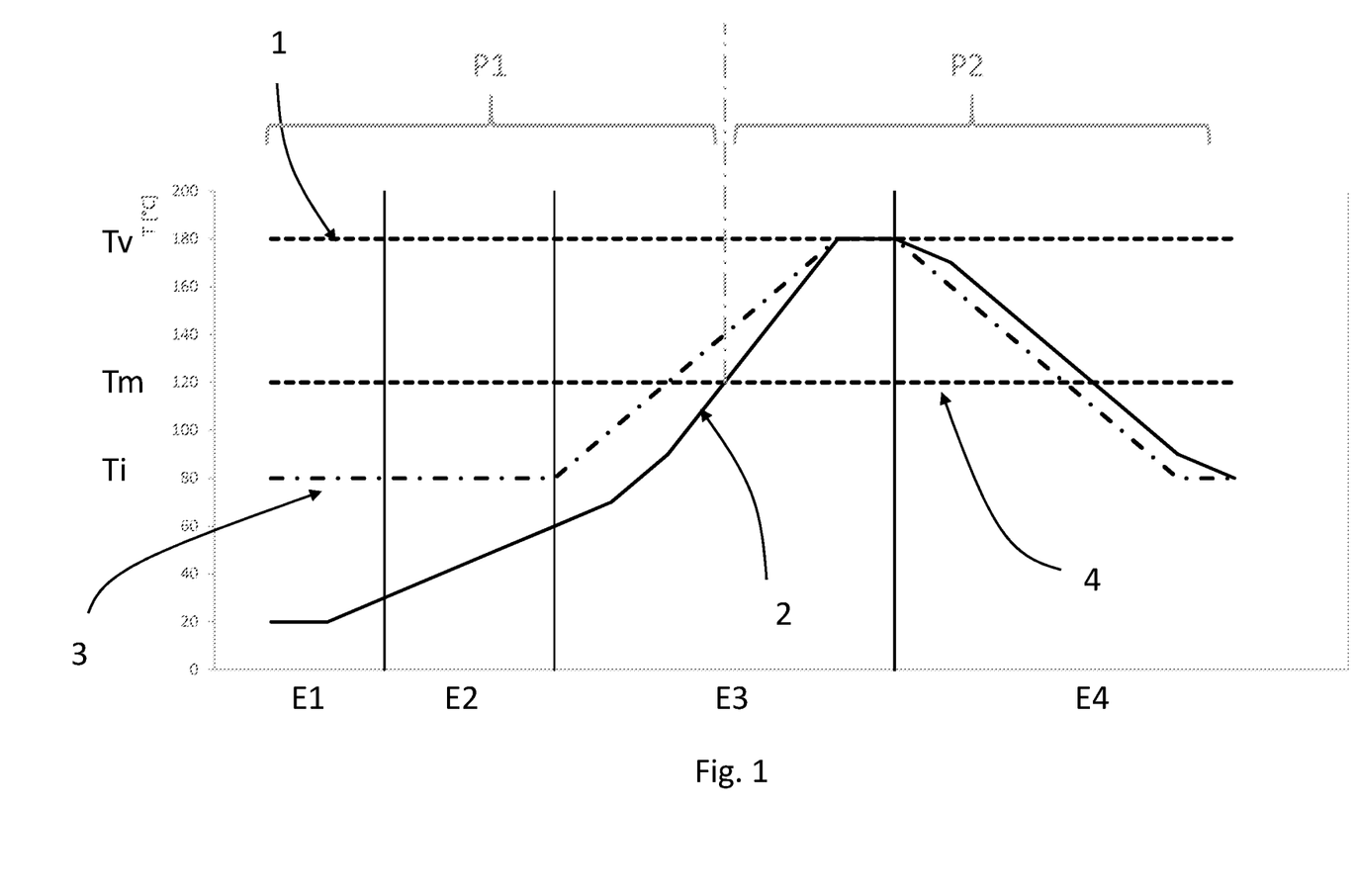
FIG. 1 represents the conventional progression of various temperatures during the implementation of the conventional manufacturing process of the prior art.

FIG. 1 represents the progression of the temperature of the injection mold (curve 1), the progression of the surface temperature of the metal insert (curve 2) and the progression of the temperature of the elastomer material (curve 3) during a conventional implementation of the conventional manufacturing process according to the prior art mentioned above.

In the implementation of this process in the conventional way, the mold is brought, from the start of the process, to a high working temperature, which corresponds to the vulcanization temperature Tv of the chosen elastomer material. This temperature of the mold is then kept constant at this value throughout the manufacturing process. The elastomer material is injected at an injection temperature Ti, then its temperature increases under the effect of the heat provided by the mold, during the third step E3, until its vulcanization temperature Tv is reached which enables it to stabilize in its final form. During this process, an increase in temperature of the surface of the metal insert is observed as soon as the insert is put in place during the first step E1, then this increase continues during the injection second step E2 and the vulcanization third step E3. Its temperature converges toward the temperature of the mold (which is therefore also the vulcanization temperature Tv), which will be reached at the latest at the end of the vulcanization third step E3. Finally, the temperatures of the elastomer material and of the metal insert naturally decrease during the fourth step E4 during which the finished component is removed from the mold. The mold itself retains its working temperature close to Tv.

Figure 2:
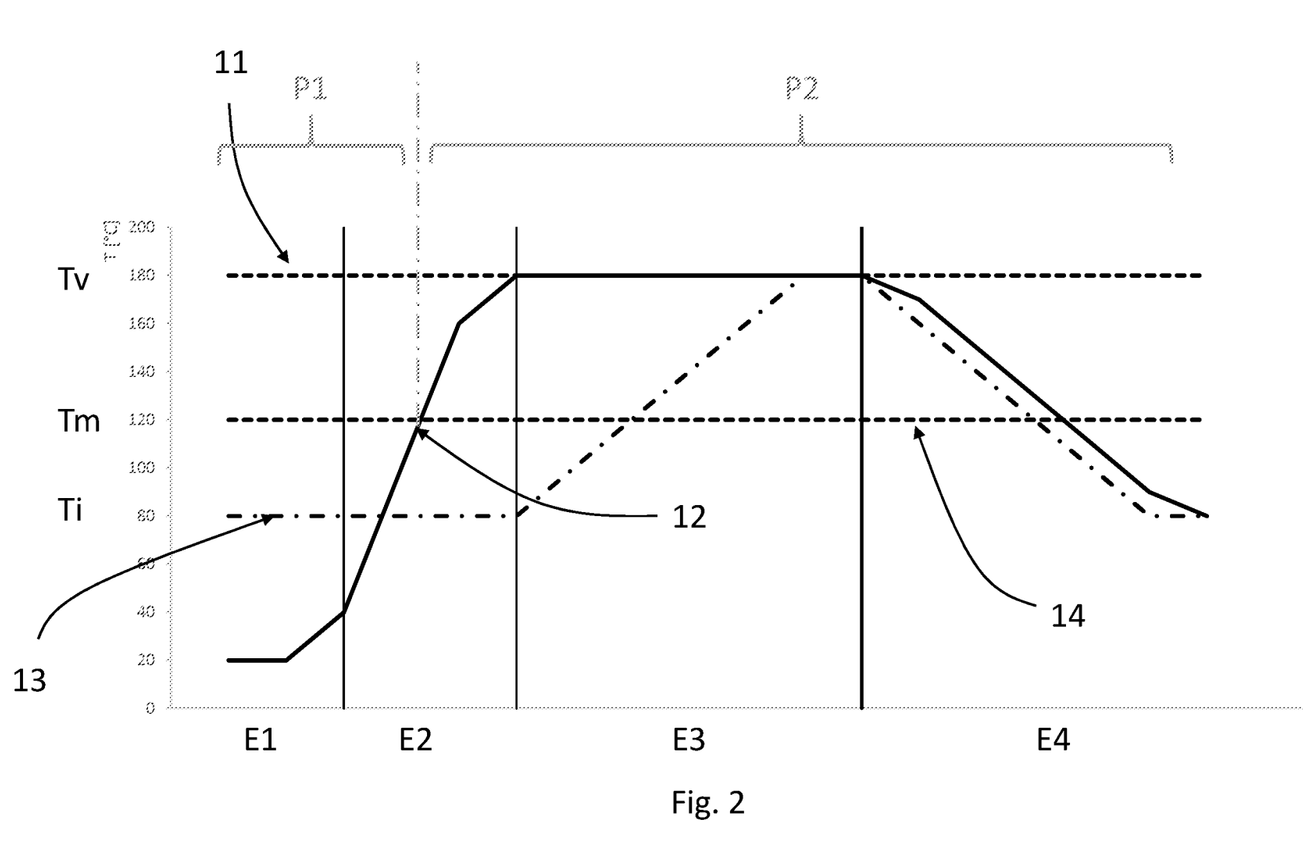
FIG. 2 represents the progression of the same various temperatures during the implementation of the conventional manufacturing process of the prior art according to a new risk scenario.

According to the invention, it has been imagined to manufacture a new timepiece component, which could lead to risks with the conventional manufacturing process. By way of example, such a component could comprise a metal insert having a large surface area relative to its volume, such as a thin strip, or having a low thermal inertia, and could for example be made of gold, silver or copper, for example in the form of a metal strip with a view to manufacturing a wrist strap strand or in the form of small-sized timepiece components. FIG. 2 represents the same curves as those of FIG. 1, in one such new scenario. The temperature curve 11 of the mold and the temperature curve 13 of the elastomer material remain unchanged: indeed, the temperature of the mold is still set at the vulcanization temperature Tv and remains constant at this value throughout the process, and the temperature of the elastomer material progresses naturally in the same way between its first set injection temperature Ti and the second vulcanization temperature Tv set by the mold. On the other hand, the curve 12, which represents the progression of the surface temperature of the metal insert as a function of time, progresses differently: indeed, in this new use, the surface temperature of the insert increases much more rapidly than that of a bulkier insert such as the one corresponding to FIG. 1, which is caused by the particular geometry and/or the particular material of this metal insert which favors heat conduction toward its surface. It is noticed in this scenario that this temperature could reach or come very close to the temperature of the mold, that is to say the vulcanization temperature Tv, before the end of the injection second step E2.

The manufacture of such a new timepiece component thus poses a new technical problem. Indeed, when use is made of a primer deposited at the surface of the metal insert, as in the prior art, it is advisable to take into account the fact that such a primer degrades at a maximum allowable temperature Tm, which is represented by the curves 4, 14 on FIGS. 1 and 2 respectively. In general it is found that this maximum allowable temperature Tm of a primer has a value between the injection temperature Ti and the vulcanization temperature Tv. In the case of the prior art illustrated in FIG. 1, the injection of the material is finished before the temperature of the surface of the insert reaches the maximum allowable temperature for the primer Tm. On the other hand, the scenario in the event of using the conventional process with an insert having a high surface area/volume ratio as illustrated in FIG. 2 shows that the surface temperature of the metal insert exceeds the maximum temperature Tm during the injection second step E2, which leads to the risk of degradation of all or some of the primer deposited on the metal insert. In the case of such a degradation of the primer before the end of the injection step E2 of the process, the elastomer material risks not adhering correctly to all or some of the surface of the metal insert if it reaches this surface when the primer has already degraded. During the use of the component thus formed, the metal insert could thus move relative to the elastomer material with which it is coated, due to the lack of adhesion between the two elements. The behavior of the timepiece component thus manufactured would be modified thereby and the insert rendered mobile within the component could even damage the elastomer material by shear. In other words, the use of the conventional manufacturing process would not make it possible to reliably manufacture a timepiece component in certain particular configurations.

Naturally, FIG. 2 represents one possible scenario by way of example. A multitude of other possible scenarios exist, in which the curve 12 could take another shape, while comprising an excessively fast and risky rise during the injection step of the process, which would bring the temperature of the surface of the insert to a temperature above the maximum allowable temperature Tm for the primer.

This same risk could furthermore exist in another alternative to the conventional process, with a so-called low-temperature primer, which is advantageous since it is more ecological, but the maximum allowable temperature Tm of which would be lower, that is to say that the curves 4, 14 from FIGS. 1 and 2 would be lowered. In such an alternative, one would naturally be more exposed to the risk of a too rapid temperature increase of the metal insert, beyond the maximum temperature Tm, before the end of the injection step E2.

In summary, the conventional process for manufacturing a timepiece component overmoulded with elastomer, as described in detail previously, is subjected to a first temperature constraint imposed by the injection temperature Ti of the elastomer material, in general between 70° C. and 90° C., substantially equal to 80° C., and to a second constraint imposed by the vulcanization temperature of this same elastomer material Tv, in general between 150° C. and 190° C., substantially equal to 180° C. It is furthermore subjected to a third temperature constraint, which is the maximum allowable temperature Tm for the primer, in general between 110° C. and 130° C., substantially equal to 120° C. A new technical problem, illustrated previously, has been demonstrated, consisting of a problem of adhesion of the elastomer material to the metal insert in certain particular configurations, due to these temperature constraints that may appear incompatible with one another in certain envisaged alternatives. Therefore, the expansion of the conventional manufacturing process is in fact limited by this demonstrated technical problem and the conventional manufacturing process does not respond to the new requirements of the watchmaking sector.

Thus, the invention proposes an improvement of the conventional manufacturing process, one embodiment of which will now be described in detail below, in order to solve the new technical problem described in detail above and to enable a more reliable manufacture of a timepiece component comprising an elastomer material overmoulded over a metal insert.

The concept of the invention is based on a variable temperature of the injection mold, which has in a first phase of the process a temperature below the temperature in the second phase of the process. By this variation of the temperature of the injection mold, and the lowering of its temperature in the first phase of the process, the surface of an insert present in the mold will heat up less rapidly and in a more controlled manner than in the conventional process and the risk explained previously will be reduced, or eliminated. Such a variation in temperature of the injection mold, which leads to a variation in the surface temperature of the metal insert, therefore makes it possible, by itself, to provide an improvement relative to the existing conventional process.

Figure 3:
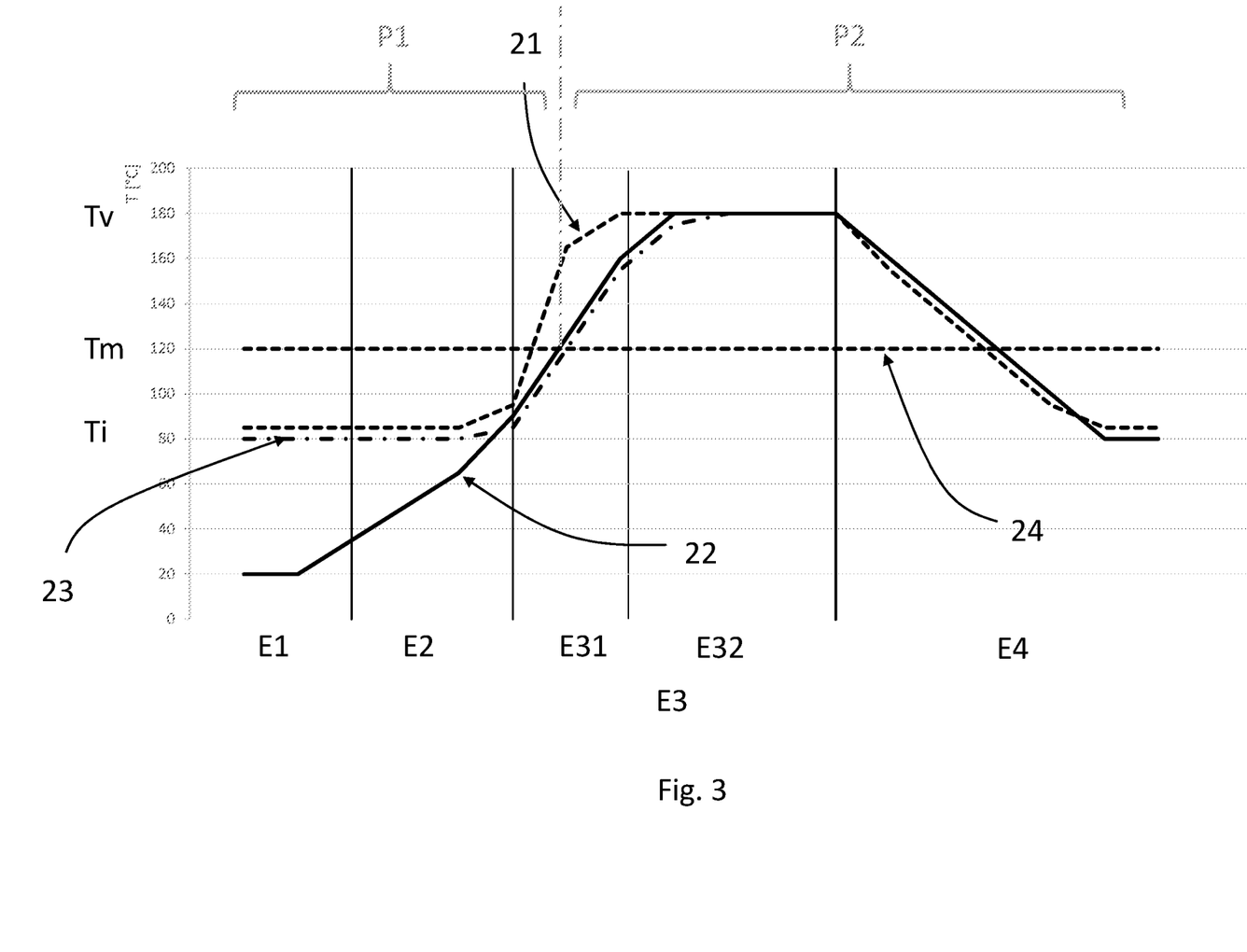
FIG. 3 represents the progression of the same various temperatures during the implementation of the manufacturing process according to one embodiment of the invention in the same so-called risk scenario.
Figure 4:
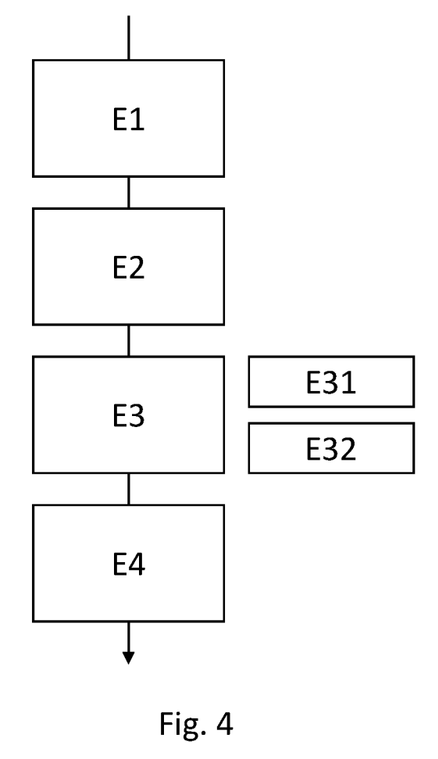
FIG. 4 schematically represents the process for manufacturing a timepiece component according to one embodiment of the invention.

One detailed embodiment of the invention is in particular illustrated by FIG. 3, which reproduces the various temperature progressions over time during the implementation of the process for manufacturing a timepiece component according to the embodiment of the invention, in a manner similar to FIGS. 1 and 2, in the same scenario is that of FIG. 2. The manufacturing process according to the embodiment is also schematically illustrated by FIG. 4. It differs from the conventional manufacturing process in that the temperature of the mold is variable, and comprises a temperature hold below the degradation temperature of the adhesion primer during the step of injecting the elastomer, and a lowering of the temperature of the mold at the end of the cycle. The manufacturing process according to the embodiment of the invention furthermore comprises, within the vulcanization step E3 as described previously, a step E31 of increasing the temperature of the injection mold aiming to maximize the adhesion of the elastomer on the insert and an actual vulcanization step E32 strictly speaking. These two steps E31 and E32 may be successive or as a variant partially or completely simultaneous. Furthermore, the step E31 of increasing the temperature of the injection mold may optionally begin slightly before the end of the injection step E2. These steps depend in particular on the type of elastomer and on the geometry of the metal insert.

In this embodiment of the invention, the temperature of the mold is first set at a first reduced value, preferably substantially equal to the value of the injection temperature Ti. It is in any case kept low enough to ensure that the temperature of the surface of the insert placed in the mold remains below the degradation temperature Tm of the adhesion primer until substantially the end of the injection step E2. This temperature value is preferably kept constant until the end of the injection step E2, therefore throughout the whole duration of the first and second steps E1, E2 of the process. Next, during the step E31 of increasing the temperature, the temperature of the injection mold is increased in a controlled manner, preferentially with temperature holds that make it possible to control the temperature of the metal insert, up to the second value corresponding to the vulcanization temperature Tv. The curve 21 thus illustrates the progression of the temperature of the injection mold according to the embodiment: it has an increasing portion, forming a ramp, that may be substantially linear over one or more parts, between the end of the injection step E2 and the start of the actual vulcanization step E32, in order to move gradually from the aforementioned temperature Ti to the aforementioned temperature Tv. As a variant, the temperature progression curve between the end of the injection step E2 and the start of the actual vulcanization step E32 may comprise one or more holds that aim to consolidate the adhesion of the elastomer on the insert. Note that in order to simplify the description, use is simply made of the term "temperature" for "temperature value". The curve 23 represents the progression of the temperature of the elastomer material. This temperature is substantially equal to the injection temperature Ti up to the end of the injection step E2, then increases under the effect of the increase in the temperature of the mold until the vulcanization temperature Tv is reached during the third step E3. One advantageous effect of the embodiment of the invention is visible in the curve 22 of the progression of the temperature of the surface of the metal insert. Specifically, it appears that this temperature increases from ambient temperature during the first two steps E1, E2, while remaining under the temperature of the mold, that is to say the temperature Ti in the example illustrated, at the end of the injection step E2. Thus, this solution guarantees that the temperature of the surface of the metal insert will never exceed a chosen temperature threshold, which is set by the temperature of the mold. Naturally, this temperature is advantageously chosen to be below the maximum allowable temperature Tm for the primer. Via this embodiment, when the elastomer material comes into contact with the surface of the metal insert during the injection step E2, it is ensured that the temperature of this surface is below the degradation temperature of the primer, which has the result of guaranteeing the good adhesion of the elastomer material on the metal insert. The embodiment therefore responds well to the technical problem explained previously.

Figure 5:
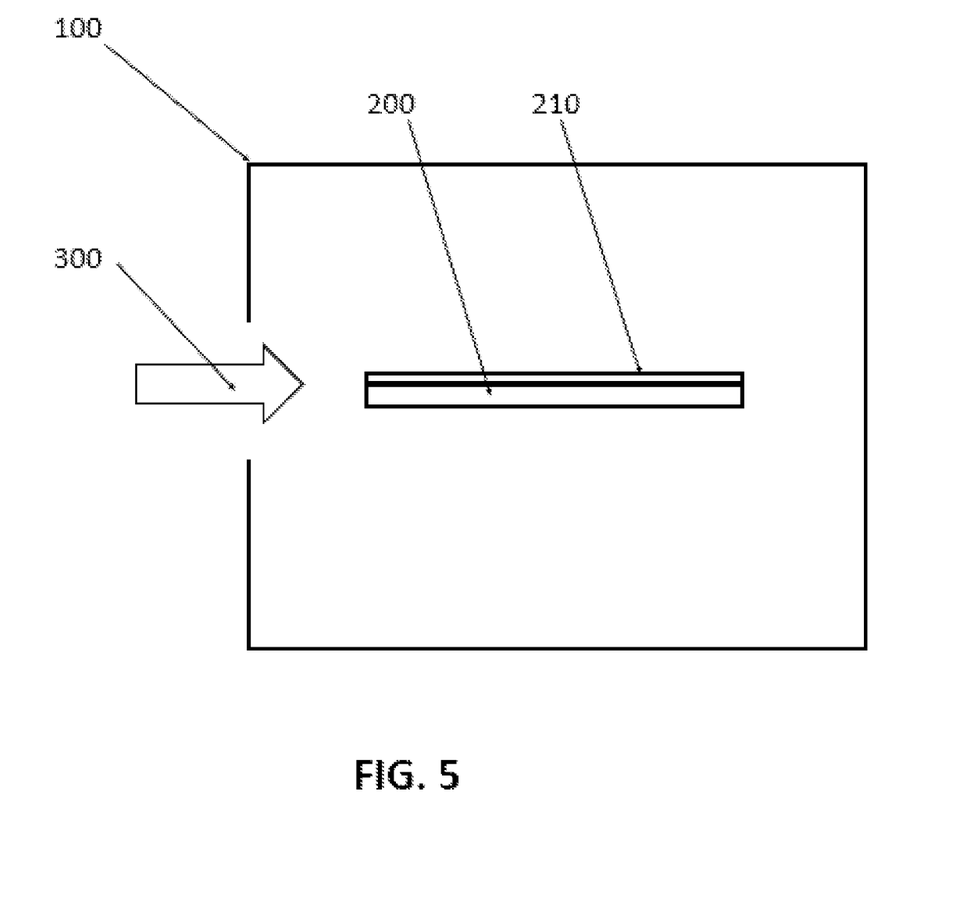
FIG. 5 schematically shows features according to some embodiments of the invention.

FIG. 5 schematically illustrates features according to some embodiments of the invention, including an injection mold 100, a metal insert 200 arranged within the mold 100 having a surface at least partially coated with a primer 210, and an elastomer material 300 injected into the mold 100 to overmold the elastomer material over the metal insert.

Note that it appears that embodiment variants can easily be envisaged. For example, the curve 24 from FIG. 3 could correspond to a temperature lowered to the value of the temperature of the mold of steps E1 and E2, namely the injection temperature Ti according to this example, without risk. It will therefore be possible to use any adhesion primer whose maximum allowable temperature Tm lies above the injection temperature Ti of the elastomer. Alternatively, the temperature of the mold could be different from the injection temperature, for example higher or lower than this injection temperature value. Advantageously, any solution in which the temperature of the mold is below the maximum allowable temperature of the primer in a first phase P1 of the manufacturing process, that may extend up to the end of the second injection step E2, may form an embodiment variant of the invention. These solutions have the effect of guaranteeing that the increase in the temperature of the surface of the metal insert above the maximum allowable temperature Tm of the primer will take place within the context of the vulcanization third step E3, which has no detrimental effect on the adhesion which is already completely achieved; in other words, the primer has already fulfilled its role of adhesion at the end of the second step E2 of the process. In any case, these solutions therefore have the result that the whole of the elastomer material has time to adhere perfectly to the metal insert over its entire surface, or over only a predefined surface portion of the metal insert.

Thus, the embodiment of the invention responds well to the new technical problem identified, by having the effect of reducing the increase in surface temperature of a metal insert arranged in an injection mold and having the result of good adhesion between the elastomer material and the metal insert, in all possibilities of use of the manufacturing process.

The embodiment of the invention thus makes it possible for example to manufacture a wrist strap from a metal insert that is in the form of a thin metal strip. Such a metal strip may be thin, for example between 0.01 and 2 mm inclusive, and/or have a large surface area, characterized for example by a width of between 5 and 30 mm inclusive and/or a length of between 2 and 200 mm inclusive, approaching the total length of a wrist strap strand. The specificity of such a metal insert in the form of a thin metal strip is to make it possible to obtain a wrist strap that is rigid enough to be compatible with complex and efficient clasps and fastening devices, while making it possible to obtain a very thin, flexible wrist strap that does not exhibit elongation during the tensile stressing of the wrist strap. Naturally, one effect of such a metal strip is to heat very rapidly at the surface when it is positioned in contact with or in the vicinity of a heat source, which is unfavorable during the implementation of the manufacturing process, as has been described previously. However, as explained previously, the embodiment of the invention is compatible with the use of such a metal strip. More generally, the embodiment of the invention is compatible with a metal insert of any shape or material capable of rapidly heating at the surface, such as a strip, a metal tube, a metal wire or an assembly of metal wires. For example, such a metal insert typically has a surface area to volume ratio of greater than or equal to 20 $mm^{-1}$, or greater than or equal to 10 $mm^{-1}$, or greater than or equal to 1 $mm^{-1}$.

Besides the geometric features mentioned above, a metal insert may also be capable of heating rapidly due to its property of high thermal conductivity. Thus, such an insert may be made of a highly conductive material such as metal, in particular may be made of an alloy of gold and/or of silver, or made of platinum. More generally, such an insert may have a high thermal conductivity, greater than or equal to 50 W/mK, or greater than or equal to 100 W/mK, or greater than or equal to 300 W/mK, or even greater than or equal to 400 W/mK.

Finally, the process of the invention makes it possible to manufacture a timepiece component from a metal insert combining a particular geometry and a high thermal conductivity.

As was explained above, the manufacturing process according to the embodiment of the invention is furthermore also advantageous in that it enables the use of a low-temperature primer at the surface of a metal insert. Such a low-temperature primer is characterized by a maximum allowable temperature of less than or equal to 100° C., or less than or equal to 80° C. Furthermore, the process according to the embodiment of the invention remains compatible with all primers. This primer will advantageously be chosen as a function of the metal and/or of the elastomer material. It may in particular be chosen from the following products, known by their trade name: CILBOND®, MEGUM®, THIXON® or CHEMOSIL®. The maximum allowable temperature of the latter primers is substantially equal to 120° C. Beyond that, the primer degrades and no longer correctly fullfils its adhesion role.

In a complementary manner, the manufacturing process according to the embodiment of the invention is furthermore also advantageous in that it modifies the fourth conventional step that becomes a cooling step E4 consisting in lowering the temperature of the mold in a controlled manner before removing the components from the mold after injection. In the conventional process, as indicated in FIGS. 1 and 2, the finished parts are removed from the mold when still hot and cooled naturally. Some rubbers have a risk of tearing that increases with temperature, and components of complex geometries such as those presented in document EP2505095 may prove tricky to remove from the mold at high temperature. The cooling of the mold as takes place in the embodiment in the last cooling step E4 makes it possible to lower the risk of tearing upon removal from the mold of pads as described within document EP2505095. The temperature starting from which a complex component may be removed from the mold while minimizing the risks of tearing depends on the geometry of the component and on the type of material.

Naturally, the manufacturing process according to the embodiment of the invention is not limited to an implementation in the examples mentioned explicitly, but may also be used for any manufacture of a timepiece component comprising at least one metal insert covered with at least one elastomer material, including for manufacturing an existing timepiece component manufactured in the prior art by the conventional manufacturing process. Furthermore, the timepiece component manufactured may be a wrist strap, as mentioned previously. It may also be a middle coated with rubber, a bezel coated with an elastomer or a movement component coated with an elastomer, such as a shock absorber for example.

In all the embodiments, the elastomer material may be any elastomer material, for example a natural or synthetic rubber. According to one embodiment, this material may be a fluoroelastomer, for example of the type known by its trade name FKM. Note that such an elastomer material is injected into a mold in a pasty phase, then adopts its stable final form, that of the mold, after its vulcanization, which is generally carried out at a temperature substantially equal to 180° C., in any case at a temperature above the injection temperature, which is generally substantially equal to 80° C. Note that an elastomer is defined as a polymer having elastic properties obtained after crosslinking. It withstands very large deformations before breaking, and regains its initial shape once the stress is released. An elastomer should not be confused with a thermoplastic material. On the other hand, the invention also applies to combinations of materials comprising a mixture between an elastomer material and another material such as a thermoplastic (one such example of a mixture is thus known by the name thermoplastic elastomer). Thus, the term "elastomer material" is extraordinarily understood to mean a material that may comprise less than 100% of elastomer material, but preferably at least 50% of elastomer material.

The metal insert may be made of any metal or metal alloy. It may in particular be a superelastic metal, for example a metal known by its trade name Nitrinol. It may also be made of metal such as an alloy of gold and/or of silver, and also made of platinum, as mentioned previously. As a variant, it could be made of an alloy chosen from brasses or steels. As an alternative to metal, the insert may be made of other overmoldable materials such as ceramic or cermets. In this case, the invention makes it possible to use primers having very low degradation temperatures.

The process for manufacturing a timepiece component according to one embodiment of the invention is not limited to the examples described previously. Thus, embodiment variants can be envisaged, in which the temperature of the mold varies differently from the example illustrated by the curve 21 of FIG. 3.

In all cases, this temperature of the mold is variable and has at least one value lower in the first phase P1 of the process comprising all or part of the injection step E2 than in the second phase P2 comprising all or part of the step E3 of vulcanizing the elastomer material. The progression of this temperature between these two temperature values may be any progression; it may comprise one or more temperature holds. Said first phase P1 may comprise all or part of the injection step E2, or even a part of the vulcanization third step E3. The second phase P2 begins at the moment when the surface temperature of the insert reaches the maximum allowable temperature of the adhesion primer, and finishes once the part is completely vulcanized. This second phase may begin during the third step E3, or at the end of the injection second step E2, or even slightly before the end of this injection second step E2 since it could be observed that the total surface area of the metal insert is completely covered before the end of the injection of the elastomer material.

A person skilled in the art will know how to set the various parameters of the invention from among the materials of the timepiece component to be manufactured, the elastomer, the metal insert and the primer, their shapes, the temperature of the mold and its progression over time, as a function of the injection temperature and vulcanization temperature of the elastomer material, and as a function of the maximum allowable temperature of the primer. A person skilled in the art will indeed set these parameters so as to avoid too rapid a heating of the surface of the metal insert, that is to say that would exceed the maximum allowable temperature of the primer.

Thus, according to embodiments of the invention, the manufacturing process comprises all or some of the following steps:

- a step that consists in depositing an adhesion primer on the surface of the metal insert;
- a step E1 that consists in placing said metal insert in the mold, then in closing the mold;
- an injection step E2 that consists in injecting the elastomer into the mold;
- a vulcanization step E3, split into two substeps E31 and E32, that consists of the increase E31 in the temperature of the mold in order to bring it to the vulcanization temperature of the elastomer, and a step E32 of actual vulcanization until the elastomer is completely vulcanized;
- one or more temperature holds between the injection step E2 and the actual vulcanization step E32;
- a cooling step E4 that consists in cooling the mold and in removing the timepiece component;
- a step E31 of increasing the temperature of the injection mold carried out between a first temperature at a first instant of the injection second step E2 and a second temperature at a second instant of the vulcanization third step E3;
- a temperature increase step carried out between two low and high temperature values, it being possible for this increase to be linear, according to one or more ramps or according to any other curve;
- a temperature increase that has at least one hold, or two or more than two holds;
- an increase in the temperature of the injection mold beginning at a low enough value at the start of the process so as not to require a hold or slowing down making it possible to prevent it from reaching the degradation temperature of the primer before the end of the injection step E2;
- heating the injection mold at a first so-called low temperature between 60° C. and 120° C. inclusive, or between 70° C. and 110° C. inclusive, or substantially equal to 80° C. or 100° C.;
- maintaining the first temperature throughout all or part of the injection step;
- heating the mold from the first temperature to the second so-called high temperature between 150° C. and 220° C. inclusive, or between 160° C. and 200° C. inclusive, for example substantially equal to 180° C.;
- maintaining the second temperature until the end of the vulcanization step.

At the same time as these various steps, the process according to the invention therefore comprises at least two phases P1 and P2, represented in FIGS. 1 to 3, the first phase P1 extending from the insertion of the metal insert in the mold until the temperature of the surface of said metal insert reaches the maximum usage temperature of the adhesion primer and the second phase P2 then extending until the complete vulcanization of the elastomer coating the metal insert and the removal of the part from the mold.

The process according to the invention therefore involves a heat cycle in the injection mold, comprising the following characteristics:

- a so-called low first temperature range, close to the injection temperature of the elastomer;
- a so-called high second temperature range, at or slightly above the vulcanization temperature of the elastomer;
- an increase in the temperature between said two low and high temperature values, it being possible for this increase to be linear or according to any other curve;
- a lowering of the temperature between said high and low temperature values, it being possible for this decrease to be linear or according to any other curve.

The invention also relates to a device for manufacturing a timepiece component that implements the manufacturing process. For this, the manufacturing device comprises an injection mold and a device for regulating the temperature of the mold, comprising for example a computer that sets a chosen setpoint temperature for the temperature of the mold, and controls a heating device of the mold in order to follow this setpoint temperature. The temperature of the injection mold is thus perfectly controlled. It is controlled, or regulated. Similarly, the surface temperature of the insert is also controlled, or regulated. Indeed, it is possible to calculate this surface temperature value of the insert, by estimation from heat transfers and/or by direct or indirect measurement.

According to one embodiment variant, the process for manufacturing a timepiece component may comprise another step of injecting a second elastomer material, which is preferably different from the first elastomer material. This other injection step is carried out in the same injection mold as the step of injecting the first elastomer material, which may comprise a slide. During this other injection step, which follows the step E3 of vulcanizing the first material, the injection mold is firstly brought, by heating or cooling, to a temperature which guarantees the good adhesion of the second elastomer material to the first elastomer material. The mold will then be heated to the vulcanization temperature of the second material in order to enable the vulcanization thereof, then cooled to enable the timepiece component to be removed from the mold.

The invention also relates to a timepiece component as is, since, as was explained, the improvement in the conventional manufacturing process by the invention makes it possible to manufacture new timepiece components. Particularly, such a timepiece component comprises a metal core completely or partially covered by an elastomer material, this metal core having at least one very thin zone, of less than or equal to 5 mm, or less than or equal to 2 mm, or less than or equal to 0.5 mm. As a variant, this metal core comprises a surface area to volume ratio of greater than or equal to $1~\text{mm}^{-1}$, or greater than or equal to $10~\text{mm}^{-1}$, or greater than or equal to $20~\text{mm}^{-1}$.

Finally, the timepiece component obtained comprises an adhesive layer originating from the primer, comprising in particular the active compound of the primer such as silane, positioned between the elastomer material and the metal insert and ensuring the adhesion of these two elements. This adhesive layer advantageously extends over the entire contact area of the two materials, and preferably over the entire outer surface area of the metal insert.

The invention claimed is:

1. A process for manufacturing a timepiece component comprising:
   arranging a metal insert in an injection mold, one surface of the metal insert being at least partially coated with a primer,
   injecting an elastomer material into the injection mold in order to overmold the elastomer material over the metal insert,
   vulcanizing the elastomer material, wherein the temperature of the injection mold is variable,
   wherein the process comprising increasing the temperature of the injection mold between a first temperature at a first instant during the injecting, and a second temperature higher than the first temperature at a second instant, during the vulcanizing,
   wherein the injection mold is heated to and maintained at the first temperature during all or some of the injecting.

2. The process for manufacturing a timepiece component as claimed in claim 1, wherein the process comprises a first phase during which the injection mold reaches the first temperature, and a second phase comprising heating the injection mold to the second temperature corresponding substantially to the vulcanization temperature of the elastomer material, during the vulcanizing, enabling the elastomer material injected during the injecting to be vulcanized, the first temperature being below the maximum allowable temperature for the primer.

3. The process for manufacturing a timepiece component as claimed in claim 1, wherein at least one selected from the group consisting of the first temperature and the duration of a first phase during which the injection mold reaches the first temperature is/are defined so that the temperature of the surface of the insert coated with the primer does not exceed the maximum allowable temperature for the primer before the surface of the insert is covered by the elastomer material injected.

4. The process for manufacturing a timepiece component as claimed in claim 1, wherein the second temperature of the injection mold is reached at least at the end of the vulcanizing.

5. The process for manufacturing a timepiece component as claimed in claim 1, wherein the process comprises cooling the injection mold before the timepiece component is removed from the mold.

6. The process for manufacturing a timepiece component as claimed in claim 1, wherein at least one selected from the group consisting of:
   the first temperature is between 60° C. and 120° C. inclusive, and
   the second temperature is between 150° C. and 220° C. inclusive.

7. The process for manufacturing a timepiece component as claimed in claim 1, wherein the process comprises at least one of the following:
   maintaining the temperature of the injection mold at the first temperature throughout the injecting;
   performing a substantially linear increase in the temperature of the injection mold between the first and second temperatures;
   performing an increase in the temperature of the injection mold having at least one temperature hold and at least one temperature ramp.

8. The process for manufacturing a timepiece component as claimed in claim 1, wherein the maximum allowable temperature for the primer is below or equal to 120° C.

9. The process for manufacturing a timepiece component as claimed in claim 1, wherein the metal insert comprises a superelastic metal.

10. The process for manufacturing a timepiece component as claimed in claim 1, wherein the process comprises a second injecting of a second elastomer material after the vulcanizing of the first elastomer material, in the same injection mold as the injection mold used for the injecting of an elastomer material overmoulded over the metal insert, and wherein the process comprises, prior to the second injecting, heating or cooling the injection mold to a temperature that guarantees the good adhesion of the second elastomer material to the first elastomer material.

11. The process for manufacturing a timepiece component as claimed in claim 6, wherein at least one selected from the group consisting of:
   the first temperature is between 70° C. and 110° C. inclusive, and
   the second temperature is between 160° C. and 200° C. inclusive.

12. The process for manufacturing a timepiece component as claimed in claim 7, wherein the process comprises
   performing an increase in the temperature of the injection mold having at least two temperature holds and more than one temperature ramp.

13. The process for manufacturing a timepiece component as claimed in claim 8, wherein the maximum allowable temperature for the primer is below or equal to 100° C.

14. The process for manufacturing a timepiece component as claimed in claim 9, wherein the superelastic metal is selected from the group consisting of an alloy of gold, an alloy of silver, an alloy of gold and silver, and platinum.

15. The process for manufacturing a timepiece component as claimed in claim 9, wherein the superelastic metal is covered with a primer.

16. The process for manufacturing a timepiece component as claimed in claim 1, wherein the steps of increasing the temperature of the injection mold between a first temperature at a first instant during the injecting, and a second temperature higher than the first temperature at a second instant, during the vulcanizing consists of regulating the temperature of the injection mold.

17. The process for manufacturing a timepiece component as claimed in claim 1, wherein the first temperature of the injection mold at the first instant during the injection is substantially equal to the injection temperature.

* * * * *